3,391,168
1,17-DIMETHYL-5-ANDROSTANE-3β,17β-DIOL
AND ESTERS THEREOF
Raymond E. Counsell, Ann Arbor, Mich., and Paul D. Klimstra, Northbrook, Ill., assignors to G. D. Searle & Co., Chicago, Ill., a corporation of Delaware
No Drawing. Filed Aug. 23, 1965, Ser. No. 481,917
2 Claims. (Cl. 260—397.5)

ABSTRACT OF THE DISCLOSURE (Optionally 17-alkylated) 1α-methyl-5α-androst-2-en-17β-ols useful as pharmacological agents, e.g. anabolic, androgenic, estrogenic, anti-estrogenic and anti-algal, and preparable by reaction of the corresponding (optionally 17-alkylated) 5α-androst-1-en-3-ones with a methyl organometallic reagent followed by reduction of the 3-keto group, conversion of the resulting 3-hydroxy group to suitable ester and pyrolysis of that ester.

---

The present invention is concerned with monounsaturated 1α-methyl steroidal derivatives which are more particularly defined as (optionally 17-alkylated) 1α-methyl-5α-androst-2-en-17β-ols as represented by the following structural formula

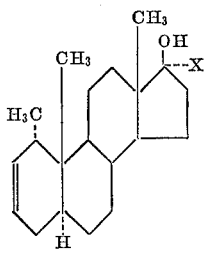

wherein X can be hydrogen or a lower alkyl radical.

The lower alkyl radicals designated by X in the foregoing structural representation are exemplified by methyl, ethyl, propyl, butyl, pentyl, hexyl, heptyl, and the branched-chain groups isomeric therewith.

The compounds of this invention are useful as a result of their valuable pharmacological properties. They are anabolic and androgenic agents, for example, which exhibit a favorable anabolic/androgenic ratio. In addition, they exhibit estrogenic and anti-estrogenic properties. These compounds, furthermore, are anti-algal agents as is evidenced by their ability to inhibit the growth of such organisms as *Chorella vulgaris*.

Suitable starting materials for the manufacture of the compounds of the present invention are the 3-keto-Δ¹ compounds encompassed by the following structural formula

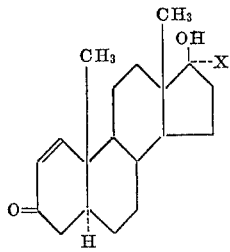

wherein X can be hydrogen or a lower alkyl radical. When these substances are contacted with a suitable alkyl organometallic agent, for example a methyl magnesium halide, the corresponding 1α-methyl-5α-androstan-3-ones are produced. Reduction of the 3-keto group is suitably effected by utilization of a reducing agent such as lithium tri-(tertiary-butoxy) aluminum hydride in a suitable organic solvent medium to produce the corresponding 1α-methyl-5α-androstan-3β-ols. Esterification of the 3-hydroxy group with p-toluenesulfonyl chloride affords the 3-p-toluenesulfonates which are pyrolyzed by heating in a suitable high boiling medium to afford the instant 1α-methyl-5α-androst-2-enes. The latter sequence of reactions is specifically illustrated by the reaction of 17β-hydroxy-17α-methyl-5α-androst-1-en-3-one with methyl magnesium bromide in tetrahydrofuran followed by acidic hydrolysis of the adduct to produce 17β-hydroxy-1α,17α-dimethyl-5α-androstan-3-one, reduction of the latter substance with lithium tri-(tertiary-butoxy) aluminum hydride in tetrahydrofuran to produce 1α,17α-dimethyl-5α-androstane-3β,17β-diol, selective esterification of that diol with p-toluenesulfonyl chloride in pyridine to afford the corresponding 3-p-toluenesulfonate followed by heating of that ester in collidine, thus affording the desired 1α,17α-dimethyl-5α-androst-2-en-17β-ol.

An alternate procedure for manufacture of the instant 17-hydroxy compound involves, as the first step, protection of that moiety, in the intermediate compound, with a readily removable group. Thus, the reaction of 17β-hydroxy-1α-methyl-5α-androstan-3-one with dihydropyran in the presence of p-toluenesulfonic acid results in the corresponding 17β-tetrahydropyran-2-yloxy derivative. Reduction of the 3-keto group by means of lithium tri-(tertiary-butoxy) aluminum hydride in tetrahydrofuran followed by esterification of the resulting 3-hydroxy compound with p-toluenesulfonyl chloride in pyridine affords 1α-methyl-17β-tetrahydropyran-2-yloxy-5α-androstan-3β-ol 3-p-toluenesulfonate. Pyrolysis of that substance by heating in collidine followed by removal of the protecting group, suitably by reaction with p-toluenesulfonic acid in methanol, affords, the instant 1α-methyl-5α-androst-2-en-17β-ol.

The novel 17-alkyl-1α-methyl-5α-androstane-3β,17β-diols and 3-p-toluenesulfonates corresponding, as is described hereinbefore, are useful as intermediates to the 1α-methyl-Δ² compounds of the present invention. These intermediates in addition display valuable pharmacological properties. Thus, they exhibit anabolic, androgenic, estrogenic, anti-estrogenic and anti-fertility activity.

The invention will appear more fully from the examples which follow. These examples are not to be construed as limiting the invention either in spirit or in scope, however, as many modifications both in materials and methods will be apparent from this disclosure to those skilled in the art. In these examples, temperatures are indicated in degrees centigrade (° C.) and quantities are given in parts by weight unless otherwise noted.

Example 1

To a solution containing 200 parts by volume of 3 M ethereal methyl magnesium bromide in 315 parts of tetrahydrofuran, under nitrogen, is added 3.2 parts of cuprous chloride. The resulting mixture is stirred and cooled to 0–5°, after which time a solution of 20 parts of 17β-hydroxy-17α-methyl-5α-androst-1-en-3-one in 315 parts of tetrahydrofuran is added dropwise over a period of about 45 minutes. Toward the end of the addition period a further quantity of tetrohydrofuran is added in order to lower the viscosity of the mixture. Stirring is continued for about 10 minutes longer, and the reaction mixture is poured into a two-phase system consisting of ice-water and ether. The aqueous layer is then saturated with sodium chloride, and the organic layer is separated, washed successively with dilute hydrochloric acid saturated with sodium chloride, dilute sodium hydroxide saturated with sodium chloride and finally with water. Drying over anhydrous sodium sulfate containing decolorizing carbon followed by distillation of the solvent under reduced pressure affords the crude product as a glass. That material is dissolved in methanol, and the resulting solution is decolorized with activated carbon, then is evaporated to dryness. The resulting residue is recrystallized from aqueous methanol to afford pure 17β-hydroxy-1α,17α-dimethyl-5α-androstan-3-one, melting at about 182–184°. This compound is characterized further by an optical rotation, in chloroform, of +3°.

Example 2

To a solution of 8 parts of 17β-hydroxy-1α-methyl-5α-androstan-3-one in 117 parts of tetrahydrofuran is added, with stirring and cooling at 0–5°, a solution of 30 parts of lithium tri-(tertiary-butoxy) aluminum hydride in 117 parts of tetrahydrofuran. The resulting reaction mixture is stirred at that temperature for about 2½ hours longer, then is poured into excess ice-cold 10% aqueous acetic acid. The oily precipitate which separates is collected by filtration, then is washed with water and dried in air. Recrystallization of that crude product from acetone-hexane affords 1α-methyl-5α-androstane-3β,17β-diol. Further purification is effected by adsorption of that material on a silica gel chromatographic column followed by elution of the column with 50% ethyl acetate in benzene and recrystallization of the eluted fraction from aqueous methanol.

Example 3

To a solution of 2 parts of 17β-hydroxy-1α-methyl-5α-androstan-3-one and 2.2 parts of dihydropyran in 20 parts of methylene chloride is added, with cooling, 0.1 part of p-toluenesulfonic acid monohydrate. The reaction mixture is kept at room temperature for about 2 days, then is washed with dilute aqueous sodium bicarbonate and dried over anhydrous sodium sulfate containing decolorizing carbon. The volatile organic materials are removed by distillation under reduced pressure, and the residual yellow solid is recrystallized from methanol to afford pure 1α-methyl-17β-tetrahydropyran-2-yloxy-5α-androstan-3-one, melting at about 147–150°. This compound displays an optical rotation, in chloroform, of +36°.

Example 4

To an ice cold solution of 5 parts of 17β-hydroxy-1α,17α-dimethyl-5α-androstan-3-one in 67 parts of tetrahydrofuran is added a cooled solution of 19 parts of lithium tri-(tertiary-butoxy) aluminum hydride in 45 parts of tetrahydrofuran. The reaction mixture is stirred at room temperature for about 16 hours, then is poured carefully into excess ice cold 5% acetic acid. Crystallization of the product is accelerated by cooling at 0–5°, and the resulting precipitate is collected by filtration, then is washed with water and dissolved in methanol. The methanol solution is filtered through diatomaceous earth, then is diluted carefully with water in order to effect the formation, as needle-like crystals, of 1α,17α-dimethyl-5α-androstane-3β,17β-diol, melting at about 162–164°. This compound is characterized further by an optical rotation, in chloroform, of +17°. It is represented by the following structural formula

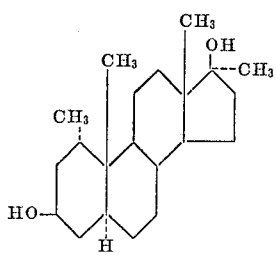

Example 5

To a mixture of 4 parts of 1α-methyl-5α-androstane-3β,17β-diol and 4 parts of p-toluenesulfonyl chloride is added, with cooling, 10 parts of pyridine. The resulting mixture is allowed to stand at room temperature for about 21 hours, then is poured into excess dilute hydrochloric acid. The gummy precipitate which separates is collected by filtration and washed with water to afford 1α-methyl-5α-androstane-3β,17β-diol 3-p-toluenesulfonate.

Example 6

To a mixture of 2 parts of 1α,17α-dimethyl-5α-androstane-3β,17β-diol and 2 parts of p-toluenesulfonyl chloride, under nitrogen, is added, with cooling, 5 parts of pyridine, and the resulting reaction mixture is allowed to stand at room temperature for about 16 hours, then is poured into excess dilute hydrochloric acid. The resulting precipitate is collected by filtration, then is washed with water and recrystallized from aqueous acetone to afford 1α,17α-dimethyl-5α-androstane-3β,17β-diol 3-p-toluenesulfonate, melting at about 116–119°. This compound can be represented by the following structural formula

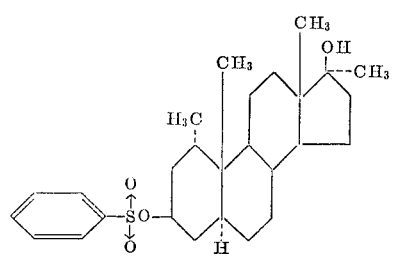

Example 7

A solution of 5 parts of 1α-methyl-5α-androstane-3β,17β-diol 3-p-toluenesulfonate in 119 parts of collidine is heated at the reflux temperature for about 16 hours, then is poured carefully into a mixture of ice and water containing 55.2 parts of concentrated sulfuric acid. The precipitate which forms is isolated by filtration, then is washed with water and dissolved in ether. The ether solution thus obtained is washed successively with 10% sulfuric acid, water and 5% aqueous sodium bicarbonate, then dried over anhydrous sodium sulfate containing decolorizing carbon and stripped of solvent by distillation under reduced pressure. The resulting oily residue is dissolved in benzene, and the benzene solution is chromatographed over silica gel, then eluted with 5% ethyl acetate in benzene. The eluted fraction is isolated as a glass, which is purified by recrystallization from aqueous methanol to afford 1α-methyl-5α-androst-2-en-17β-ol, melting at about 114–117°. This compound exhibits infrared absorption maxima in chloroform at about 2.75, 3.41 and 6.02 microns and is further characterized by the following structural formula

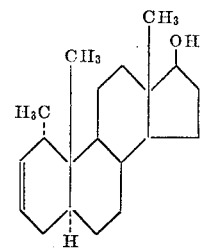

Example 8

A solution of 2.6 parts of 1α,17α-dimethyl-5α-androstane-3β,17β-diol 3-p-toluenesulfonate in 92 parts of collidine is heated at the reflux temperature, in a nitrogen atmosphere, for about 9 hours, then is kept at room temperature for about 16 hours. The mixture thus obtained is poured into cold water containing 44 parts of concentrated sulfuric acid, and the resulting acidic mixture is extracted with ether. The ether layer is separated, washed with water and distilled to dryness under reduced pressure to afford a residual glass-like material. That crude product is recrystallized from aqueous methanol to afford pure 1α,17α-dimethyl-5α-androst-2-en-17β-ol, melting at about 61–62°. This compound is represented by the following structural formula

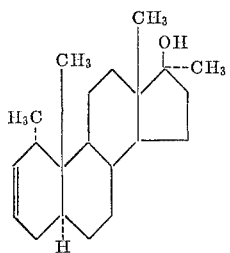

Example 9

When an equivalent quantity of 17α-ethyl-17β-hydroxy-5α-androst-1-en-3-one is subjected to the successive processes described in Examples 1, 4, 6, and 8, there is obtained 17α-ethyl-1α-methyl-5α-androst-2-en-17β-ol.

What is claimed is:
1. 1α,17α-dimethyl-5α-androstane-3β,17β-diol.
2. 1α,17α-dimethyl-5α-androstane-3β,17β-diol 3-p-toluenesulfonate.

References Cited
UNITED STATES PATENTS 3,239,542    3/1966    Bowers et al. _____ 260—397.4
3,324,152    6/1967    Muller et al. _____ 260—397.5

ELBERT L. ROBERTS, *Primary Examiner.*